(12) United States Patent
Tarasinski et al.

(10) Patent No.: US 8,256,544 B2
(45) Date of Patent: Sep. 4, 2012

(54) ELECTRIC SYSTEM FOR PROVIDING ELECTRICAL POWER FOR A VEHICLE AND AN IMPLEMENT

(75) Inventors: Nicolai Tarasinski, Frankenthal (DE); Klaus Hahn, Mannheim (DE)

(73) Assignee: Deere & Company, Moline, IL (US)

( * ) Notice: Subject to any disclaimer, the term of this patent is extended or adjusted under 35 U.S.C. 154(b) by 146 days.

(21) Appl. No.: 12/601,151

(22) PCT Filed: May 27, 2008

(86) PCT No.: PCT/IB2008/003976
§ 371 (c)(1),
(2), (4) Date: Jul. 7, 2010

(87) PCT Pub. No.: WO2009/122237
PCT Pub. Date: Oct. 8, 2009

(65) Prior Publication Data
US 2010/0308559 A1 Dec. 9, 2010

(30) Foreign Application Priority Data
May 24, 2007 (DE) .......................... 10 2007 024 645

(51) Int. Cl.
*B60K 25/00* (2006.01)
(52) U.S. Cl. ....................................................... 180/53.5
(58) Field of Classification Search ................. 180/53.5, 180/53.4, 65.1; 280/422, 425.1
See application file for complete search history.

(56) References Cited

U.S. PATENT DOCUMENTS

| | | | |
|---|---|---|---|
| 4,196,785 A * | 4/1980 | Downing, Jr. | 180/6.28 |
| 5,998,944 A * | 12/1999 | Clutter et al. | 318/141 |
| 7,870,915 B2 * | 1/2011 | Beeson et al. | 180/53.1 |
| 8,008,800 B2 * | 8/2011 | Mackin et al. | 307/9.1 |
| 2008/0087480 A1 * | 4/2008 | Tarasinski et al. | 180/65.4 |
| 2010/0155036 A1 * | 6/2010 | Andris et al. | 165/104.31 |
| 2011/0204712 A1 * | 8/2011 | Tarasinski et al. | 307/9.1 |

* cited by examiner

Primary Examiner — Faye M. Fleming

(57) ABSTRACT

The invention relates to a device for supplying electricity to an agricultural utility vehicle (10) and/or an attachment (26) which can be coupled to the utility vehicle (10). The utility vehicle (10) comprises a generator (16) and an attachment interface (24). Electrical energy can be generated by means of the generator (16). At the attachment interface (24) an attachment (26) can be reversibly coupled to the utility vehicle (10). The attachment (26) has at least one electrical load by means of which an agricultural working function can be carried out. So that the attachment (26) can be controlled more flexibly or better when it is operating, the device according to the invention is defined by a transmission device and at least one transformer (40). By means of the transmission device the electrical energy which is generated by the generator (16) of the utility vehicle (10) can be transmitted in the form of alternating voltage to the attachment (26). The transformer (40) is provided on the attachment (26). By means of the transformer (40) the transmitted alternating voltage can be converted in order to be made available to the electrical load.

11 Claims, 6 Drawing Sheets

ELECTRIC SYSTEM FOR PROVIDING ELECTRICAL POWER FOR A VEHICLE AND AN IMPLEMENT

BACKGROUND OF THE INVENTION

The invention relates to a device for supplying electricity to an agricultural utility vehicle and/or an attachment which can be coupled to the utility vehicle.

Agricultural utility vehicles such as, for example, field choppers, self-propelling spraying devices and tractors are known from the prior art. A tractor is a versatile utility vehicle since different attachments can be coupled to a tractor. Ploughs, harrows, grubbers, seeders, spraying machines, rotary mowers and round balers are usually coupled to a tractor. Accordingly a tractor with a respectively coupled attachment carries out a wide variety of agricultural working functions. This makes it also necessary for the tractor to actuate the respective attachment in a corresponding way if the agricultural working function which is carried out with the attachment is carried out with an actuator, a tool or with a motor.

Attachments are known whose actuators or tools are driven mechanically, wherein mechanical driving power is transmitted to the attachment from a power take-off shaft provided on the tractor. An example of such an attachment is a round baler. Furthermore, attachments are known which are driven hydraulically. For this purpose, hydraulic quick-release couplings are provided on the tractor and are connected to hoses of the attachment. Such an attachment is, for example, a front loader or a towed spraying machine. In the case of the front loader, the boom is controlled and activated hydraulically. In the case of the towed spraying machine, the linkage is adjusted hydraulically.

Both the mechanical and the hydraulic transmission of power between the utility vehicle and the attachment entail problems in terms of actuation. It is therefore necessary, inter alia, for the internal combustion engine of the utility vehicle to be operated at a certain rotational speed and/or for the gear mechanism to have a certain, predefined transmission ratio to enable the attachment which is actuated via the power take-off shaft to be operated correctly. This may result in a poor level of efficiency of the tractor-trailer combination composed of the utility vehicle and attachment.

Attachments are known which have electrical loads. These are electric motors and/or fans of a relatively low power class. Furthermore, lighting devices and/or solenoids can be operated electrically as actuator drives. Hitherto they have been supplied by the vehicle on-board electrical system of the utility vehicle. Electrical energy which is necessary for this is generated by the conventional dynamo of the utility vehicle. Hitherto, attachments with electrical loads which have a relatively high power drain for carrying out an agricultural working function have not been used.

The problem to be solved then is that of providing a utility vehicle with an electric power supply sufficient for providing sufficient electric power for driving relatively large electrical loads of an attachment coupled to the vehicle.

SUMMARY OF THE INVENTION

According to the present invention there is provided a utility vehicle equipped with an electrical power generator for supplying an attachment coupled to the vehicle with sufficient electrical power to drive a relatively large electrical load.

The present invention is based on the object of specifying and developing a device of the type mentioned at the beginning which overcomes the above-mentioned problems. In particular, the intention is that the device will permit electricity to be supplied to an attachment which can be coupled to the utility vehicle, in which case the attachment is to be controlled more flexibly or better when it is operating, and the level of efficiency is to be raised.

According to the invention, a device of the type mentioned at the beginning is characterized by a transmission device and at least one transformer. By means of the transmission device, the electrical energy which is generated by the generator of the utility vehicle can be transmitted in the form of alternating voltage to the attachment. The transformer is provided on the attachment. The transmitted alternating voltage can be converted by means of the transformer in order to be made available to the electrical load.

According to the invention, a concept for electrically supplying the agricultural utility vehicle and/or the attachment is proposed. In this context, the attachment has an electrical load with which an agricultural working function can be carried out. Since the electrical energy is transmitted between the implement and the attachment in the form of alternating voltage, the proposed concept permits a high level of power density to be achieved when transmitting electrical energy. This results overall in an improved level of efficiency of the tractor-trailer combination composed of an agricultural utility vehicle and an attachment coupled to it, since, for example, there is no need for the rotational speed of the internal combustion engine to be associated in a compulsory fashion with the intended operating mode of the attachment. To this extent, a flexible actuation strategy which is optimized to predefined objectives can be implemented with the electrical supply concept according to the invention. For example, the utility vehicle and the attachment can be actuated or operated in such a way that the fuel consumption of the internal combustion engine is minimized. The tractor-trailer combination can also be actuated in such a way that the working steps which are to be carried out are implemented in a way which is optimized in terms of time, that is to say as quickly as possible. The power flux of the electrical energy between the utility vehicle and the attachment can be actuated in a flexible way within certain limits using appropriate power electronics.

The alternating voltage which is transmitted from the utility vehicle to the implement in accordance with the present invention comprises, in particular, a single-phase and/or multiphase alternating voltage, three-phase current, sawtooth voltage, square-wave pulses or voltage pulses.

According to one preferred embodiment, the generator generates alternating voltage or alternating current. The generator preferably is an asynchronous machine. Depending on the respective application, another electrical machine can also be used, for example a synchronous machine. The generator is preferably driven by the internal combustion engine of the utility vehicle, specifically directly by the output shaft or by the flywheel of the internal combustion engine. Specifically, the generator can be embodied in the form of a crankshaft generator. To this extent, the generator is continuously attached to the utility vehicle and integrated into the drive train of the utility vehicle and matched thereto.

So that an agricultural working function can be carried out with the electrical energy which is generated by the generator, there is provision for the generator to have a power class which is capable of continuously generating a predefined minimum power level. Specifically, the generator is configured in such a way that it can be used to generate an electrical power level of at least 10 kW, preferably 20 kW to 30 kW.

At least one rectifier can be provided for converting alternating voltage into direct voltage. Such a rectifier is preferably arranged where the direct current is required, that is to say in the spatial vicinity of the corresponding electrical load. Correspondingly, a rectifier can be provided on the utility vehicle and/or on the attachment.

In this context it may be expedient to combine a transformer and at least one rectifier in one structural unit. The structural unit may be arranged in a housing and/or a box.

If the attachment has an electrical load which is to be supplied with direct current or direct voltage, there is provision, according to one preferred embodiment, that the attachment has at least one rectifier. By means of the rectifier, the alternating voltage which is converted by the transformer is converted into direct voltage.

According to one particularly preferred embodiment, the utility vehicle and/or the attachment has a power converter by means of which direct voltage can be converted into an alternating voltage of predefined frequency and amplitude. To this extent, the power converter makes available alternating voltage to the electrical load, to be precise preferably in such a way that the alternating voltage corresponds at least largely in terms of frequency and amplitude to the prevailing requirements of the electrical load or the agricultural working function which is driven by the electrical load.

If the electrical energy which is generated by means of the generator of the utility vehicle is to be fed into a power system which is referred to ground, or if, for example, a conventional electrical load which is to be operated with three-phase current or alternating current is to be connected to the utility vehicle, there is preferably provision for the transformer to be embodied and connected in such a way that the secondary side of the transformer has a neutral point or a neutral conductor.

For reasons of safety at the utility vehicle and/or at the attachment, it may be expedient for a voltage of at maximum 60 V to be capable of being generated on the secondary side by means of the transformer. It may also be expedient to use the transformer to generate a high voltage which can be used, for example, for the electrostatic charging of liquid droplets when spraying liquids.

According to one preferred embodiment, the transformer is embodied and connected in such a way that at least two independent individual voltages can be made available. For example, an individual voltage of 12 V for supplying controllers and electronic control devices may be provided. A further individual voltage, which is independent of the latter, may be 42 V and be used to drive power assemblies or electrical loads for carrying out an agricultural working function. This may also be implemented by providing a corresponding secondary-side circuit.

If at least two electrical loads which are essentially identical are to be supplied for an attachment, the transformer can be correspondingly embodied and connected, and a corresponding circuit can be provided on the secondary side and embodied in such a way that this is possible.

At least one electrical filter by means of which electrical interference signals can be filtered out is preferably provided. The intention is that it will be used mainly to filter out undesired voltage peaks. Alternatively or additionally, the electrical filter can be embodied in such a way that it can be used to convert an existing voltage profile into a predefined voltage profile. This is expedient in particular if at the input side of the filter there is a square-wave voltage which is to be converted into an essentially sinusoidal alternating voltage at the output side, after the filter. The filter can have a combination of capacitors and inductors.

In particular if the attachment has an electric drive on the left-hand side and a further electric drive on the right-hand side, according to one preferred embodiment the attachment has at least two transformers. Even if the attachment has a plurality of sections, for example a spraying machine with a plurality of folding linkage sections, at least one transformer can be arranged respectively in each section.

It is possible to make comparable provision if the attachment is of modular design and/or can be expanded with an agricultural working function. In this case also, the attachment can have at least two transformers, and each module can respectively be assigned at least one transformer. It is therefore possible, for example, for a seeder to be of modular design and to be extended or enlarged by virtue of the fact that further seeder modules are attached to a basic module. All the seeder modules can each have a transformer. This concept is particularly suitable for an individual grain seeder.

The alternating current which is generated by the generator and/or the alternating current which is transmitted from the utility vehicle to the attachment preferably is a single-phase or multiphase alternating current. Under certain circumstances it is possible to provide that the tractor makes available both an interface for single-phase alternating current and an interface for multiphase alternating current for an attachment. Attachments with different electrical designs and properties can therefore be coupled to the utility vehicle and supplied with electrical energy by it.

According to one preferred embodiment, a transformer is provided and is embodied and/or electrically connected in such a way that part of the electrical supply system or part of the transmission device can be D.C. insulated from the rest of the electrical supply system or from the rest of the transmission device. Specifically, this transformer can be embodied in the form of an isolating transformer. Such a transformer can be arranged directly upstream or downstream of an electrical interface between the utility vehicle and the attachment at the implement end and/or attachment end.

At least two partial circuits with different voltage levels are preferably provided on the attachment. This can also be provided on the utility vehicle. The two partial circuits are preferably at a low voltage level for supplying electronic control devices and at a higher voltage level for supplying electric motors.

It is significant that, for reasons of safety, the utility vehicle and/or the attachment can have an electrical distributor system with a circuit. The electrical distributor system can be used to transmit electric current to at least one electrical load. The circuit can have an alternating current circuit or a direct current circuit, and this generally depends on the electrical load.

Since the electrical power components or loads of the attachment are operated from time to time at high power levels, a means of cooling the electrical components may be provided. A flow of material which is present at the attachment may be used for this purpose. In particular spraying mixture, seeds and/or fertilizers are possible as such a flow of material.

Alternatively or additionally, a flow of air which is present at the attachment may be used to cool electrical components of the attachment. Examples of flows of air are carrier air for spraying, carrier air for conveying seeds.

Furthermore, at least one electrical component of the attachment can be thermally connected to a supporting structure of the attachment. In this context, at least some of the heat is therefore carried away from the electrical component through heat being conducted between the electrical component and the supporting structure of the attachment. A specific measure for this may be thermal coupling between the transformer and a supporting structure of the attachment. This may be achieved by casting the transformer with a casting resin with a high thermal conductivity.

Alternatively or additionally, at least one electrical component of the attachment can be cooled with a circuit which is present at the attachment. Such a circuit can be, for example, a liquid circuit for driving hydraulic motors of the attachment. In this case, individual components of the attachment are driven hydrostatically and other components are driven electrically, wherein, for example, a hydraulic line and/or a corresponding heat exchanger are in thermal contact with the electrical component to be cooled.

In one preferred embodiment, the transformer can be fed with a square-wave voltage, in particular with voltage pulses. The square-wave voltage can be generated or output by a power converter. The square-wave voltage can be pulse-width modulated and/or frequency modulated and/or amplitude modulated.

So that the voltage and/or the current and/or the power can be adapted to the instantaneous requirements, in particular of the agricultural working function, it is possible to provide that the pulse width of the square-wave voltage can be varied in a predefined fashion. Alternatively or additionally, in order to reduce or minimize the power loss as a function of the instantaneously output power, the pulse frequency of the square-wave voltage can be varied in a predefined fashion. For this purpose, it is expedient to implement corresponding sensors and actuation algorithms with which the pulse width and/or the pulse frequency can be varied.

At least one means with which electrical insulation on the utility vehicle and/or on the attachment can be provided and/or monitored is particularly preferably provided. Such a means not only has suitable insulation of electrical cables but also at least one electrical circuit with which it is possible to monitor whether the device for supplying electricity is also sufficiently insulated. Such a means can also be designed to initiate measures if this is no longer the case. For example, the generation of the electric current can be switched off or individual partial circuits can be deactivated. Furthermore, such a means can have suitable insulation of the electrical interface between the utility vehicle and the attachment.

According to one preferred embodiment, the transformer is embodied in the form of a toroidal strip-wound core transformer with amorphous or nano-crystalline strip material. The transformer or a further transformer can also be embodied in the form of an isolating transformer, an autotransformer, an iron core transformer, a ferrite core transformer, an ironless transformer or a high-leakage reactance transformer.

If the frequency of the alternating voltage is too high for a transformer operating according to the principle of magnetic flux, the transformer can be embodied in the form of a capacitive voltage divider, i.e. a double capacitor. The transformer can also be part of a D.C./D.C. transformer.

A network is preferably provided for transmitting data, by means of which network an electronic control system of the attachment can be identified and/or actuated. Such a network can be used, inter alia, to configure a power converter of the utility vehicle. Such a network can have a CAN bus or an Ethernet data network, in particular a real-time-capable Ethernet data network.

So that the highest possible level of efficiency of the utility vehicle and/or the attachment can be achieved, a control circuit can be provided which has a power converter which is assigned to the utility vehicle and/or a control device. The control circuit can communicate with sensors and/or controllers of the attachment and have a network for transmitting data. By means of this control circuit it is possible, for example, to control the abovementioned pulse width and/or pulse frequency and/or amplitude of a square-wave voltage. It is therefore possible, for example, to provide that the control unit of the implement communicates directly with sensors of the attachment via the network and actuates the power converter as a function of the variables detected by the respective sensors, in such a way that the electrical loads of the attachment are as a result supplied directly with electrical energy without a further control unit having to be provided at the attachment.

According to one preferred embodiment, the transmission device has an electrical interface of the utility vehicle, at least one electrical line and one electrical interface of the attachment. An electrical interface can have at least one socket and/or at least one plug. The electrical line can be embodied in the form of a flexible cable with which an electrical connection can be formed between the utility vehicle and the attachment which is generally arranged such that it can move relative to the utility vehicle. The transmission device quite particularly preferably has at least one power converter which is arranged fixedly on the utility vehicle. This power converter can be configured in such a way that it generates an alternating voltage and/or a square-wave voltage of predefined frequency or pulse width from a direct current intermediate circuit of the utility vehicle, and makes said voltage available to the attachment via the transmission device. This can be done in such a way that a control device automatically identifies the attachment or the electrical loads located on it via, for example, a network for transmitting data, and automatically makes available the electrical energy to the attachment in the form in which it is required by the attachment and/or can be converted by the attachment.

According to one preferred embodiment of the present invention, an attachment has an electrical load, a transformer and an electrical interface. The attachment can be reversibly coupled to an attachment interface of the utility vehicle. An agricultural working function can be carried out by means of the electrical load. The electrical interface is electrically connected to the transformer and embodied in such a way that it can be connected to an electrical interface of a utility vehicle and as a result a device for supplying electricity can be constructed. The alternating voltage which is generated by the generator of the utility vehicle and transmitted to the attachment can be converted by means of the transformer in order to be made available to the electrical load. In particular it is possible to provide that the transformer is arranged in a housing.

According to an embodiment of the present invention which is also preferred, an agricultural utility vehicle which is embodied in particular in the form of a tractor has an attachment interface, a generator and an electrical interface. At the attachment interface, an attachment can be detachably coupled to at least one electrical load. An agricultural working function can be carried out with the electrical load of the attachment. Electrical energy can be generated by means of the generator. The generator is electrically connected to the electrical interface. The electrical interface is embodied in such a way that it can be connected to an electrical interface of the attachment and as a result a device for supplying electricity as claimed in one of claims 1 to 14 can be constructed. The electrical energy which is generated by the generator of the utility vehicle can be transmitted in the form of alternating voltage to the attachment.

There are various possible ways of advantageously configuring and developing the teaching of the present invention. In this respect, reference is made to the subsequent explanation of the preferred exemplary embodiments of the invention on the basis of the drawings. In conjunction with the explanation of the preferred exemplary embodiments of the invention, preferred refinements and developments of the teaching are also generally explained on the basis of the drawings.

DESCRIPTION OF THE PREFERRED EMBODIMENT

Identical or similar components are provided with the same reference symbols in the figures.

Figure 1:
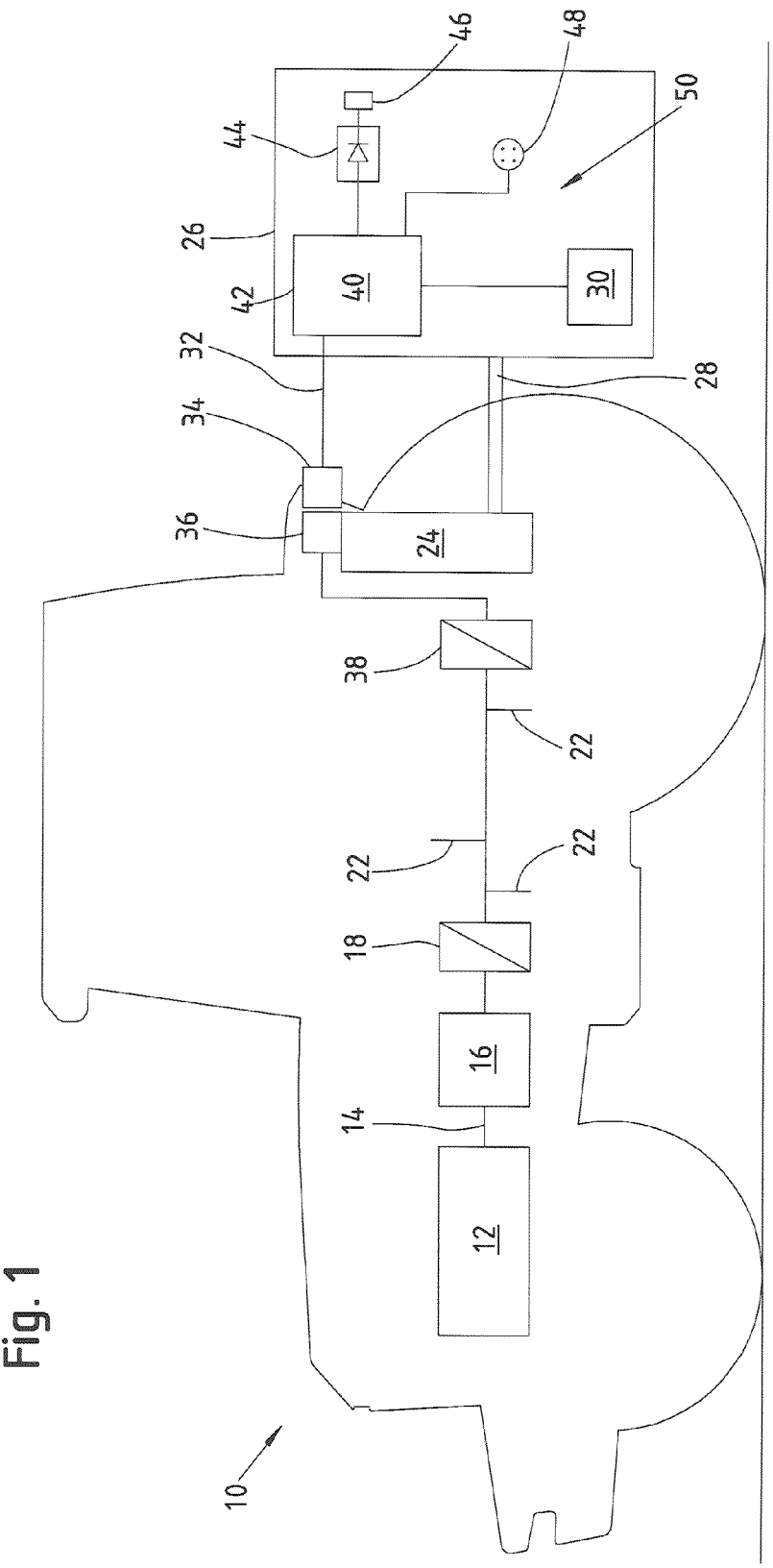
FIG. 1 is a schematic left side view of a utility vehicle equipped for producing a relatively high electrical power and being coupled to an attachment including an electrically operated device requiring the high electrical power for its operation.

FIG. 1 shows an agricultural utility vehicle 10 which is embodied in the form of a tractor. In the text which follows, the tractor is also denoted by the reference symbol 10. The tractor 10 has an internal combustion engine 12. On the one hand, the locomotive drive of the tractor 10 is driven by the output shaft 14 of the internal combustion engine 12 via a gear mechanism (not shown in FIG. 1). On the other hand, the output shaft 14 drives the generator 16. The generator 16 is permanently installed on the tractor 10. Specifically, the generator 16 is embodied in the form of a crankshaft generator and is attached by its stator to the motor housing and by its rotor to the flywheel of the internal combustion engine 12. The generator 16 generates three-phase alternating current which is converted into direct current via the power converter 18 of the generator 16 and a rectifier which is contained therein. The direct current is fed into a direct current intermediate circuit 20 (shown only in FIG. 7) of the tractor 10. The voltage of the direct current intermediate circuit 20 is approximately 700 V. There is only a schematic indication that further electrical loads (not shown in FIG. 1) are supplied via the branches 22 of the direct current intermediate circuit 20.

The tractor 10 has a mechanical coupling interface 24 which can be embodied in the form of a three-point equipment linkage, an adjustable drawbar and/or some other conventional coupling system. The attachment 26 is coupled to the coupling interface 24 of the tractor 10 via the mechanical connection 28. The attachment 26 has, inter alia, an agricultural working function which is carried out or driven with an electric motor 30. The electric motor 30 of the attachment 26 is supplied with electrical energy by the electrical supply system of the tractor 10. For this purpose, the attachment 26 is connected to an electrical interface defined by a socket 36 of the tractor 10, via an electrical line 32, and an electrical interface defined by a plug 34 of the attachment 26. The socket 36 is in turn electrically connected to a power converter 38. The power converter 38 converts the direct current of the direct current intermediate circuit 20 into alternating current. The alternating voltage is in a range from approximately 400 V to 480 V. The alternating current which is converted by the power converter 38 is fed to a transformer 40 via the line 32. Correspondingly, an alternating voltage from 400 V to 480 V is applied to the primary side of the transformer 40. The transformer 40 is provided at the attachment 26 and is permanently mounted there in a housing 42. To this extent, the transformer 40 and the housing 42 constitute one structural unit.

The transformer 40 converts the primary-side alternating voltage of 400 V to 480 V into a secondary-side alternating voltage of 200 to 240 V. Accordingly, the electric motor 30 and ultimately the agricultural working function are operated with this alternating voltage. A rectifier 44, which generates direct voltage from the secondary-side alternating voltage and makes it available via a socket 46 to an electrical load which can be adapted to the attachment 26 (not shown since it is not adapted to the attachment 26), is connected to the transformer 40. Furthermore, a three-phase current socket 48 is provided via which an electrical load can be connected (not shown in FIG. 1) which is operated with three-phase current. To this extent, the attachment 26 already has an electrical distributor system 50 with which electrical current can be made available to a plurality of electrical loads, inter alia to the electric motor 30 which is permanently installed at the attachment 26.

Figure 2:
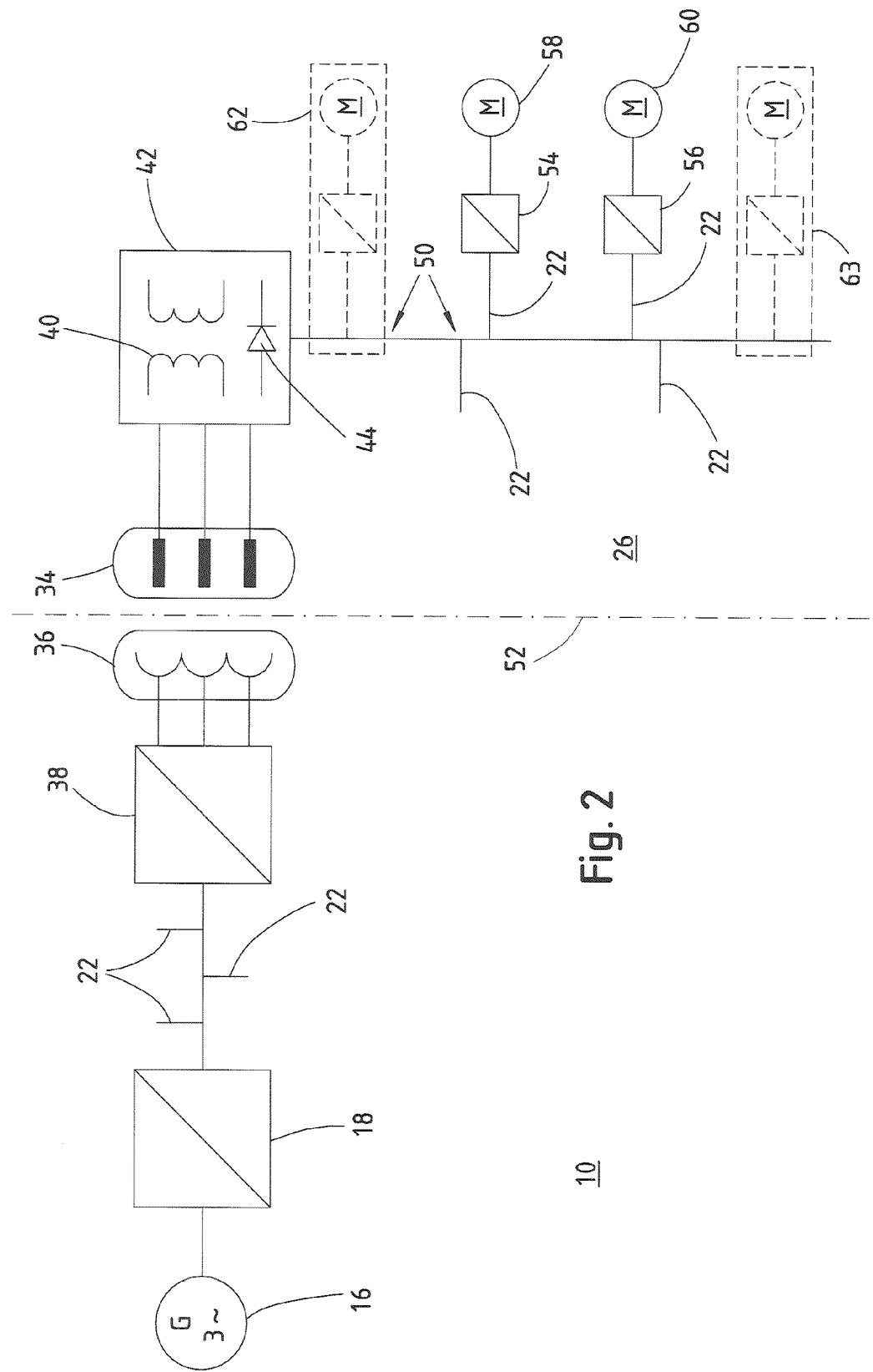
FIG. 2 shows a circuit diagram of an exemplary electrical power generating device for producing a relatively high electrical voltage coupled to electrical loads of the attachment for using the generated power.

FIG. 2 shows, in a schematic illustration, the circuit diagram of a device according to the invention for supplying an agricultural utility vehicle and an attachment which can be coupled to the utility vehicle, with neither the utility vehicle nor the attachment being shown in FIG. 2. The device for supplying the utility vehicle 10 and the attachment 26 does not differ significantly from that in FIG. 1 in terms of the method of electrical functioning. In this device also, alternating voltage is generated by means of the generator 16 and converted into direct voltage by means of the power converter/rectifier 18. The direct voltage is made available to the direct current intermediate circuit 20. The power converter 38 converts the direct voltage into three-phase alternating voltage which is applied to the socket 36 of the utility vehicle 10. If the plug 34 is plugged into the socket 36, the alternating voltage can be transmitted to the attachment 26. The separation between the utility vehicle 10 and the attachment 26 is indicated in FIG. 2 by the dashed line 52. The alternating voltage is fed to the transformer 40 which converts the alternating voltage to a relatively low voltage level. By means of the rectifier 44, which is also arranged in the housing 42, the secondary-side alternating voltage is converted into direct voltage and fed to the electrical distributor system 50 of the attachment 26. The electrical distributor system 50 also has a direct current intermediate circuit with branches 22 for further electrical loads (not shown in FIG. 2). Two power converters 54, 56, which respectively convert the direct voltage of the direct current intermediate circuit of the attachment 26 into single-phase alternating current, are connected to the electrical distributor system 50. In each case an electric motor 58, 60, which ultimately carries out the agricultural working function, can be driven with the alternating current.

The attachment 26 according to FIG. 2 is embodied in the form of an individual grain seeder and has two modules, specifically a module on the left-hand side and a module on the right-hand side of the attachment 26. The individual grain seeder can be expanded with further modules, in which case a further rectifier and a further electric motor are respectively assigned to an expansion module. This is shown with the electrical expansion modules 62, 63 which are shown by dashed lines and each have a power converter and an electric motor.

Figure 3:
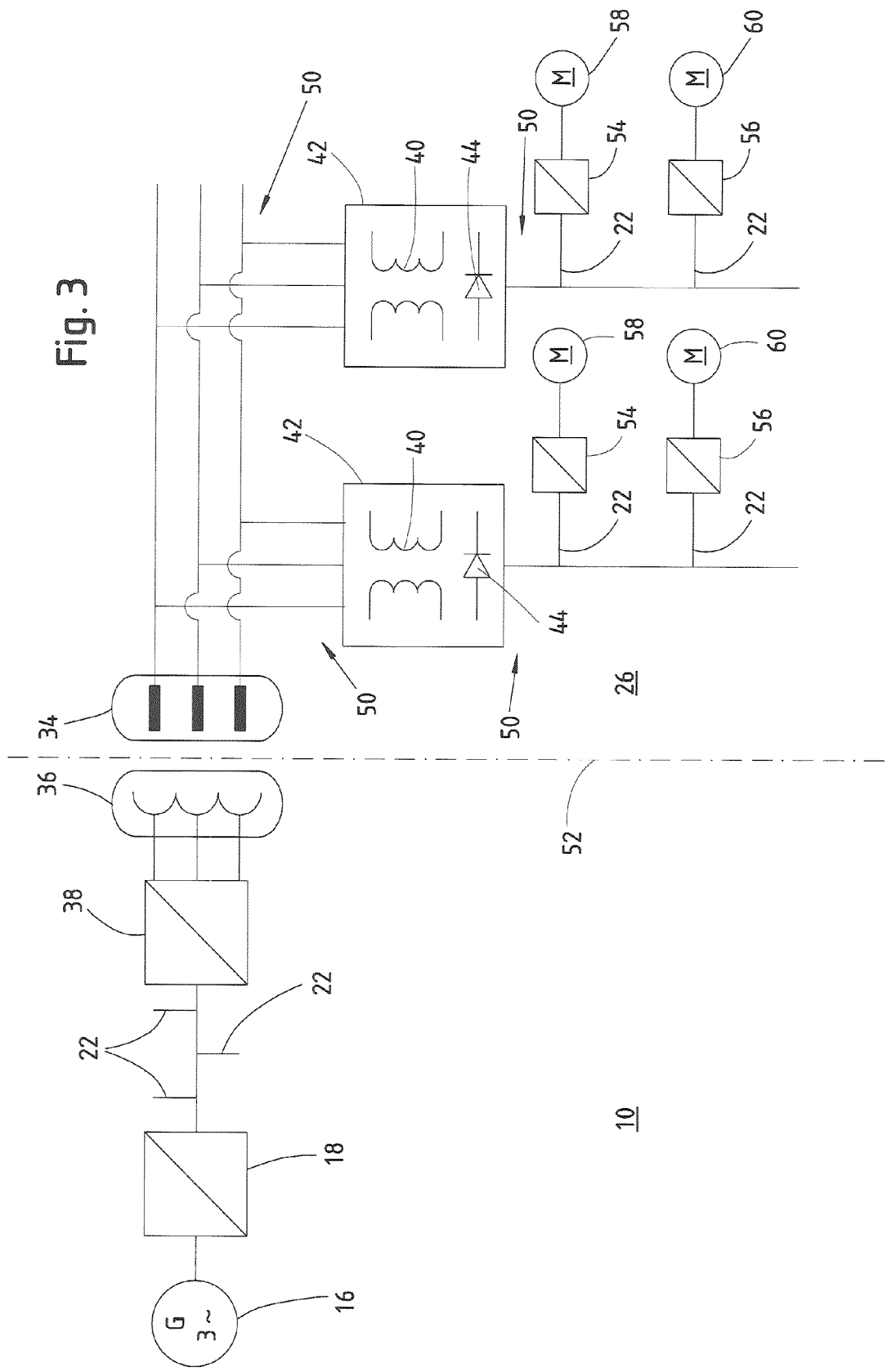
FIG. 3 shows a circuit diagram like that of FIG. 2, but showing a variant of the electrical loads of an attachment.

FIG. 3 shows an electrical circuit diagram which, on the utility vehicle side, is embodied in a similar way to that from FIG. 2. In terms of the attachment 26, said diagram is also embodied in a way which is largely comparable to that from FIG. 2. However, the attachment 26 from FIG. 3 has two housings 42 which each have a transformer 40 and a rectifier 44. The two transformers 40 are connected in parallel to the electrical distributor system 50 and they convert the three-phase current made available by the utility vehicle 10 into three-phase current with a relatively small voltage. The respective direct current intermediate circuit is supplied with direct voltage by means of the rectifiers 44. A plurality of power converter/electric motor combinations can be connected to each direct current intermediate circuit. The electrical equipment of the attachment 26 from FIG. 3 can therefore also be expanded and scaled for the respective expansion level of the attachment 26.

Figure 4:
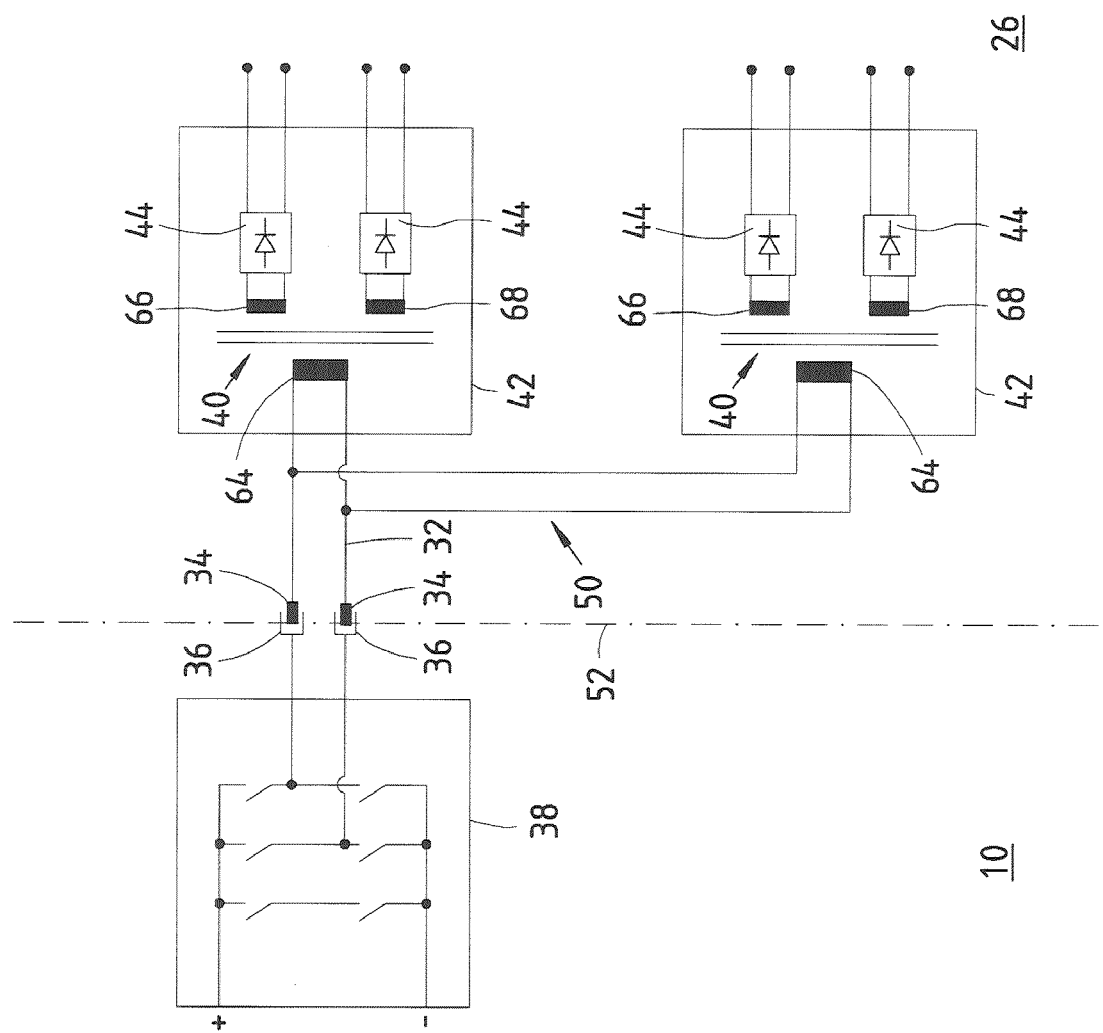
FIG. 4 shows a circuit diagram of an electrical circuit which includes variant or further details of the arrangements shown in FIGS. 2 and 3.

FIG. 4 shows a detail of an electrical circuit which represents an example of the transmission of a single-phase alternating current from the utility vehicle 10 to the attachment 26. On the utility vehicle side, only the power converter 38 is shown, said power converter 38 being connected on the left to the direct current intermediate circuit 20 (characterized by the symbols + and −). On the right, the power converter 38 is connected to the socket 36. In order to generate the single-phase alternating voltage, only four of the six switches of the power converter 38 have to be driven. The alternating voltage which is transmitted to the attachment 26 is 480 V. Two housings 42, in each of which a transformer 40 is arranged, are connected electrically in parallel to the plug 34. The transformer 40 has a coil 64 on the primary side and two coils 66, 68 on the secondary side. The first secondary-side coil 66 converts the input voltage into an alternating voltage of 12 V. The second secondary-side coil 68 converts the input voltage into an alternating voltage of 24 V. Arranged downstream of the secondary-side coils 66, 68 are two rectifiers 44 which convert the respective alternating voltage into direct voltage. Correspondingly, a controller or an electronic control unit which requires a supply voltage of 12 V can be connected downstream of the one rectifier 44. Downstream of the other rectifier 44, a power component can be connected which is supplied with 24 V direct voltage. To this extent, two partial circuits which have different voltage levels are provided for the attachment 26. The attachment 26 according to FIG. 4 can also be expanded with further housings 42 with essentially identical contents.

Figure 5:
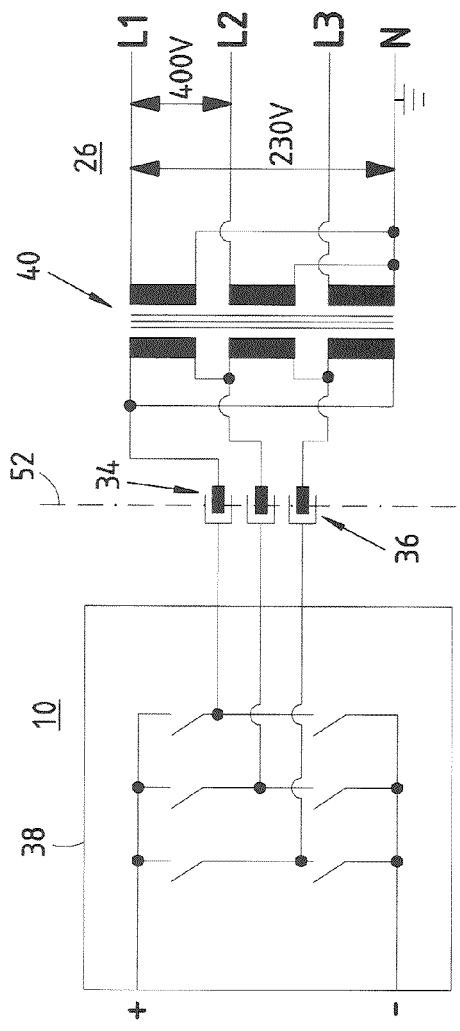
FIG. 5 shows a circuit diagram of an electrical circuit of a variant of part of the circuit shown in FIG. 4.

FIG. 5 shows a detail of an electrical circuit which constitutes an example of the transmission of a three-phase alternating current from the utility vehicle 10 to the attachment 26. On the utility vehicle side, only the power converter 38 is shown (as in FIG. 4), said power converter 38 being connected on the left to the direct current intermediate circuit 20 (indicated by the symbols + and −). On the attachment side, a three-phase transformer 40 is provided which is embodied in the form of an isolating transformer and therefore implements D.C. isolation between the electrical systems of the utility vehicle 10 and of the attachment 26. The transformer 40 is embodied and connected in such a way that it can be used to make available three-phase current with three phases and a neutral conductor on the secondary side. An electrical load (not shown in FIG. 5) for carrying out an agricultural working function can be operated with the secondary-side three-phase current.

Figure 6:
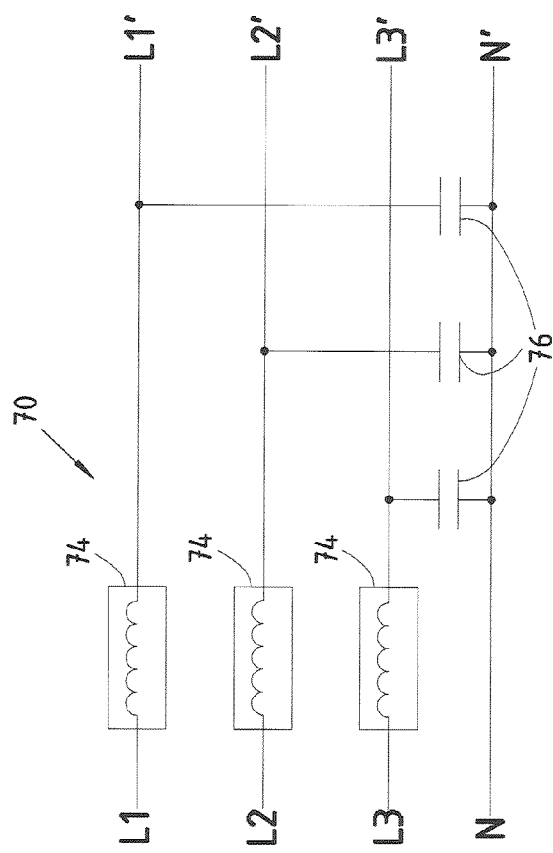
FIG. 6 shows a circuit diagram of an electric filter.

FIG. 6 shows an electrical filter 70 with which electrical interference signals can be filtered out and/or with which a square-wave voltage profile can be converted into an essentially sinusoidal voltage profile. This filter 70 can, if necessary, be inserted in any of the attachments 26 according to FIGS. 1 to 5. For example, such a filter 70 can be inserted between the transformer 40 and the three-phase socket 48 of the attachment 26 from FIG. 1. The filter 70 has coils 74 and capacitors 76.

Figure 7:
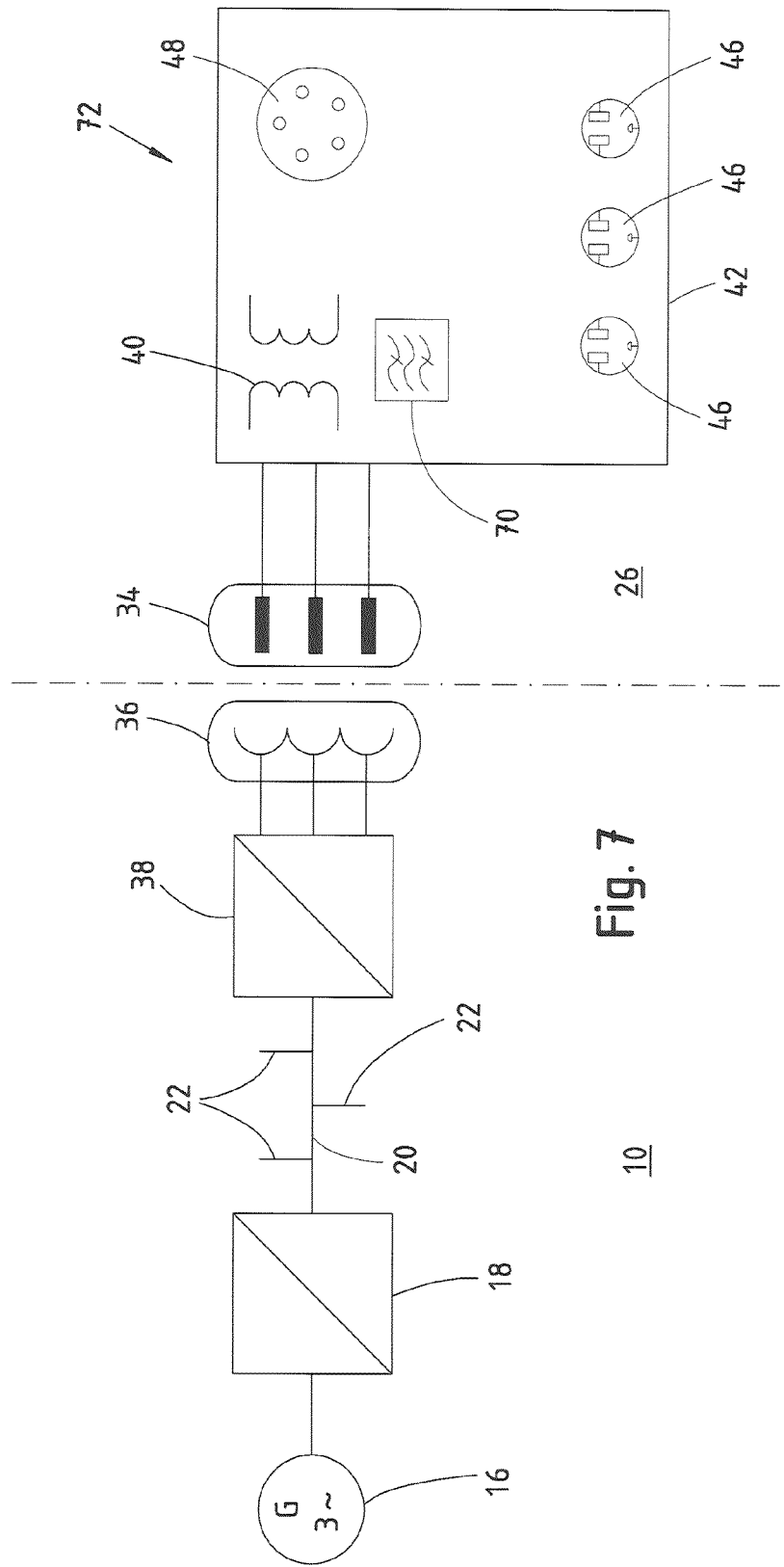
FIG. 7 shows a circuit diagram like that of FIGS. 2 and 3, but showing a further variant of the circuitry associated with the attachment.

FIG. 7 shows, in an electrical circuit diagram, electrical components of the utility vehicle 10 which are embodied in a comparable way to those from FIGS. 2 and 3. An electrical converter device 72 can be connected to the socket 36 of the utility vehicle 10. The electrical energy which is generated by the generator 16 of the utility vehicle 10 can be converted by means of the electrical converter device 72. The electrical converter device 72 comprises the transformer 40, the housing 42 and the electrical interfaces respectively defined by the plug 34 and by the sockets 46 and 48. The electrical plug 34 is used to establish the line connection to the utility vehicle 10. The two electrical sockets 46 and 48 each serve as a socket to which electrical loads (not shown in FIG. 7) can be connected. The transformer 40 is arranged in the housing 42. The transformer 40 is connected electrically to the primary side of the first electrical interface defined by the plug 34.

FIG. 1 therefore shows the attachment 26 with the electrical load, the transformer 40 and the electrical interface. The attachment 26 can be reversibly coupled to the attachment interface 24 of the utility vehicle 10. An agricultural working function can be carried out by means of the electrical load, which is embodied in the form of an electric motor 30. The electrical interface is embodied in the form of a plug 34. The electrical interface is connected electrically to the transformer 40 and is embodied in such a way that it can be connected to an electrical interface, to the socket 36, of the utility vehicle 10. As a result, a device for supplying electricity as claimed in one of claims 1 to 14 can be constructed. The alternating voltage which is generated by the generator 16 of the utility vehicle 10 and is transmitted to the attachment 26 can be converted by means of the transformer 40 in order to be made available to the electrical load. The transformer 40 is arranged in the housing 42.

Furthermore, FIG. 1 shows the agricultural utility vehicle 10, specifically the tractor 10. The utility vehicle 10 includes attachment interface 24, the generator 16 and the electrical interface defined by the socket 36. At the attachment interface 24, the attachment 26 can be detachably coupled to at least one electrical load, here shown in the form of the electric motor 30. An agricultural working function can be carried out by means of the electrical load of the attachment 26. Electrical energy can be generated by means of the generator 16. The generator 16 is connected electrically to the electrical socket 36. The electrical socket 36 is embodied in such a way that it can be connected to the electrical plug 34 of the attachment 26. As a result, a device for supplying electricity can be constructed. The electrical energy which is generated by the generator 16 of the utility vehicle 10 can be transmitted in the form of alternating voltage to the attachment 26.

In conclusion, it is to be noted quite particularly that the exemplary embodiments explained above serve merely for the purpose of describing the claimed teaching but do not restrict it to the exemplary embodiments.

The invention claimed is:

1. In a combination of an agricultural utility vehicle detachably coupled to an attachment including at least one electrical load with which an agricultural working function can be carried out, a device for supplying electricity to the vehicle and attachment, comprising:

first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;

at least one electric transformer being electrically connected to said second electrical interface, and being electrically connected to said electrical load, whereby said transformer operates to transform the current received from said generator before it is made available to said electrical load.

2. In a combination of an agricultural utility vehicle detachably coupled to an attachment including at least one electrical load with which an agricultural working function can be carried out, a device for supplying electricity to the vehicle and attachment, comprising:

first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;

at least one electric transformer being electrically connected to said second electrical interface, and being electrically connected to said electrical load, whereby said transformer operates to transform the current received from said generator before it is made available to said electrical load; and at least one rectifier is carried by said attachment and is electrically coupled to said transformer, whereby said rectifier operates to convert alternating transformed current received from said transformer to direct current.

3. In a combination of an agricultural utility vehicle detachably coupled to an attachment including at least one electrical load with which an agricultural working function can be carried out, a device for supplying electricity to the vehicle and attachment, comprising:

first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;

at least one electric transformer being electrically connected to said second electrical interface, and being electrically connected to said electrical load, whereby said transformer operates to transform the current received from said generator before it is made available to said electrical load; and one of said vehicle and attachment includes a power converter coupled for converting direct electrical current to and alternating current of predefined frequency and amplitude, with said power converter being located one of between said generator and said first electrical interface or between said transformer and said at least one electrical load.

4. In a combination of an agricultural utility vehicle detachably coupled to an attachment including at least one electrical load with which an agricultural working function can be carried out, a device for supplying electricity to the vehicle and attachment, comprising:

first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;

at least one electric transformer being electrically connected to said second electrical interface, and being electrically connected to said electrical load, whereby said transformer operates to transform the current received from said generator before it is made available to said electrical load; and said transformer is embodied and connected in such a way that a secondary side of said transformer has a neutral point, with the result that electrical energy can be fed into a power system referred to ground.

5. In a combination of an agricultural utility vehicle detachably coupled to an attachment including at least one electrical load with which an agricultural working function can be carried out, a device for supplying electricity to the vehicle and attachment, comprising:

first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;

at least one electric transformer being electrically connected to said second electrical interface, and being electrically connected to said electrical load, whereby said transformer operates to transform the current received from said generator before it is made available to said electrical load; and further including at least one electrical filter for filtering out interference signals being electrically coupled between said transformer and said at least one electrical load.

6. In a combination of an agricultural utility vehicle detachably coupled to an attachment including at least one electrical load with which an agricultural working function can be carried out, a device for supplying electricity to the vehicle and attachment, comprising:

first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;

at least one electric transformer being electrically connected to said second electrical interface, and being electrically connected to said electrical load, whereby said transformer operates to transform the current received from said generator before it is made available to said electrical load; and further including at least a second transformer connected in parallel with the first mentioned transformer, said attachment including at least a second load connected to said second transformer, with said attachment including at least two separate sections, and said first and second transformers respectively being arranged on said two separate sections.

7. In a combination of an agricultural utility vehicle detachably coupled to an attachment including at least one electrical load with which an agricultural working function can be carried out, a device for supplying electricity to the vehicle and attachment, comprising:
    first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;
    at least one electric transformer being electrically connected to said second electrical interface, and being electrically connected to said electrical load, whereby said transformer operates to transform the current received from said generator before it is made available to said electrical load; and
    said attachment is of an expandable modular construction including at least two modules, and at least two transformers being provided on said attachment with one transformer being assigned to each module.

8. In a combination of an agricultural utility vehicle detachably coupled to an attachment including at least one electrical load with which an agricultural working function can be carried out, a device for supplying electricity to the vehicle and attachment, comprising:
    first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;
    at least one electric transformer being electrically connected to said second electrical interface, and being electrically connected to said electrical load, whereby said transformer operates to transform the current received from said generator before it is made available to said electrical load;
    said alternating current supplied by said electrical generator is three phase;
    a power converter arrangement being mounted on said vehicle and electrically coupled to said generator, said power converter arrangement being operated to supply three-phase alternating electrical current to said first electrical interface, and said transformer being a three-phase isolating transformer.

9. In a combination of an agricultural utility vehicle detachably coupled to an attachment including at least one electrical load with which an agricultural working function can be carried out, a device for supplying electricity to the vehicle and attachment, comprising:
    first and second electrical interfaces respectively carried by said vehicle and said attachment and being detachably coupled to each other, an electrical generator carried by said vehicle for generating alternating electrical current, with said generator being coupled for delivering said alternating electrical current to said first electrical interface;
    at least one electric transformer being electrically connected to said second electrical interface, and being electrically connected to said electrical load, whereby said transformer operates to transform the current received from said generator before it is made available to said electrical load; and
    said at least one transformer is configured for supplying at least two circuits with voltage at different levels.

10. The combination, as defined in claim 9, wherein said at least one transformer includes first and second rectifiers respectively located for supplying said at least two circuits with direct current.

11. The combination, as defined in claim 10, wherein a second transformer identical to said at least one transformer is connected to said second electrical interface in parallel with said at one transformer.

* * * * *